United States Patent
Jung

(10) Patent No.: US 11,968,921 B2
(45) Date of Patent: *Apr. 30, 2024

(54) COMBINED DEPTH GAUGE WHEEL AND SCRAPER FOR A PLANTER

(71) Applicant: Jung Enterprise, Inc., Ipswich, SD (US)

(72) Inventor: Allan F. Jung, Ipswich, SD (US)

(73) Assignee: Jung Enterprise, Inc., Ipswich, SD (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/354,115

(22) Filed: Jul. 18, 2023

(65) Prior Publication Data

US 2023/0354737 A1    Nov. 9, 2023

Related U.S. Application Data

(63) Continuation of application No. 18/065,070, filed on Dec. 13, 2022, now Pat. No. 11,707,013, which is a continuation of application No. 17/744,817, filed on May 16, 2022, now Pat. No. 11,528,838, which is a continuation of application No. 17/399,556, filed on Aug. 11, 2021, now Pat. No. 11,330,759.

(51) Int. Cl.
*A01C 5/06* (2006.01)
*B60C 7/00* (2006.01)

(52) U.S. Cl.
CPC ............... *A01C 5/064* (2013.01); *B60C 7/00* (2013.01); *B60C 2200/08* (2013.01)

(58) Field of Classification Search
CPC ......... A01C 5/064; A01C 7/203; A01B 49/06; B60B 7/01; B60C 7/00; B60C 2200/08
See application file for complete search history.

(56) References Cited

U.S. PATENT DOCUMENTS

| | | |
|---|---|---|
| 4,408,551 A | 10/1983 | Keller |
| 5,483,907 A | 1/1996 | Gaalswyk |
| 7,040,365 B2 | 5/2006 | Lust |
| 7,938,074 B2 | 5/2011 | Liu |
| 8,303,190 B2 | 11/2012 | Shigeoka |
| 8,544,516 B2 | 10/2013 | Mariman |
| 8,720,351 B1 | 5/2014 | Wipf |
| 10,279,627 B2 | 5/2019 | Raulerson, Jr. |

(Continued)

FOREIGN PATENT DOCUMENTS

DE    102012207911 A1    11/2013

OTHER PUBLICATIONS https://web.archive.org/web/20181130143859/https://mudrx.com/ ; Mud Rx Product Webpage via Archive.org/Wayback Machine Internet Archives; Nov. 30, 2018.

*Primary Examiner* — Kip T Kotter
(74) *Attorney, Agent, or Firm* — Neustel Law Offices

(57) ABSTRACT

A depth gauge wheel for a row planter. The depth gauge wheel sets the planting depth for the seeds planted by the row planter. The depth gauge wheel sets planting depth by setting the cutting depth of the disk opener of the row planter. The depth gauge wheel also scrapes mud from the disk blade of the disk opener. The depth gauge wheel includes a rim, a tire attached to the rim and a ring attached to the rim. The tire contacts the surface of the ground to set the cutting depth of the disk opener and the ring scrapes mud from the disk blade of the disk opener.

16 Claims, 15 Drawing Sheets

(56) References Cited

U.S. PATENT DOCUMENTS

| | | |
|---|---|---|
| 10,426,076 B1 | 10/2019 | Rosenboom |
| 11,330,759 B1 | 5/2022 | Jung |
| 11,707,013 B2 * | 7/2023 | Jung .................. A01C 5/068 111/52 |
| 2010/0066155 A1 | 3/2010 | Seradarian |
| 2016/0114623 A1 | 4/2016 | Smith |
| 2017/0208734 A1 | 7/2017 | Weisz |
| 2020/0016933 A1 | 1/2020 | Knotowicz |
| 2021/0168992 A1 | 6/2021 | Phely |

* cited by examiner

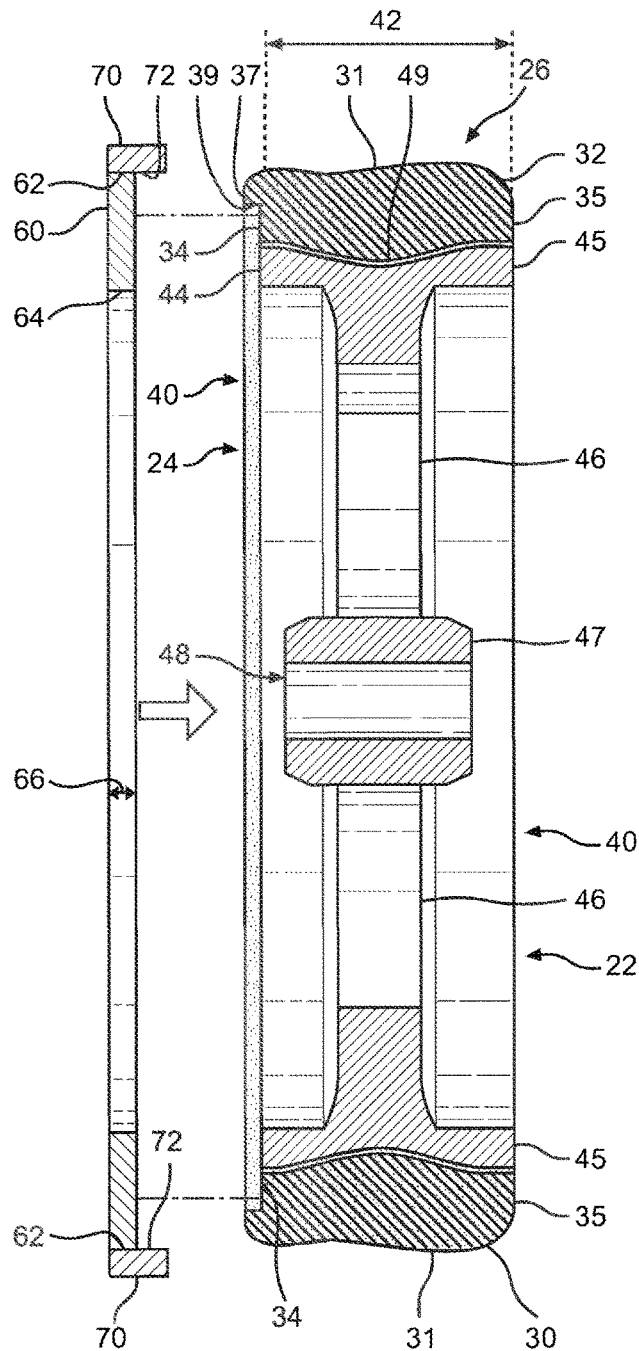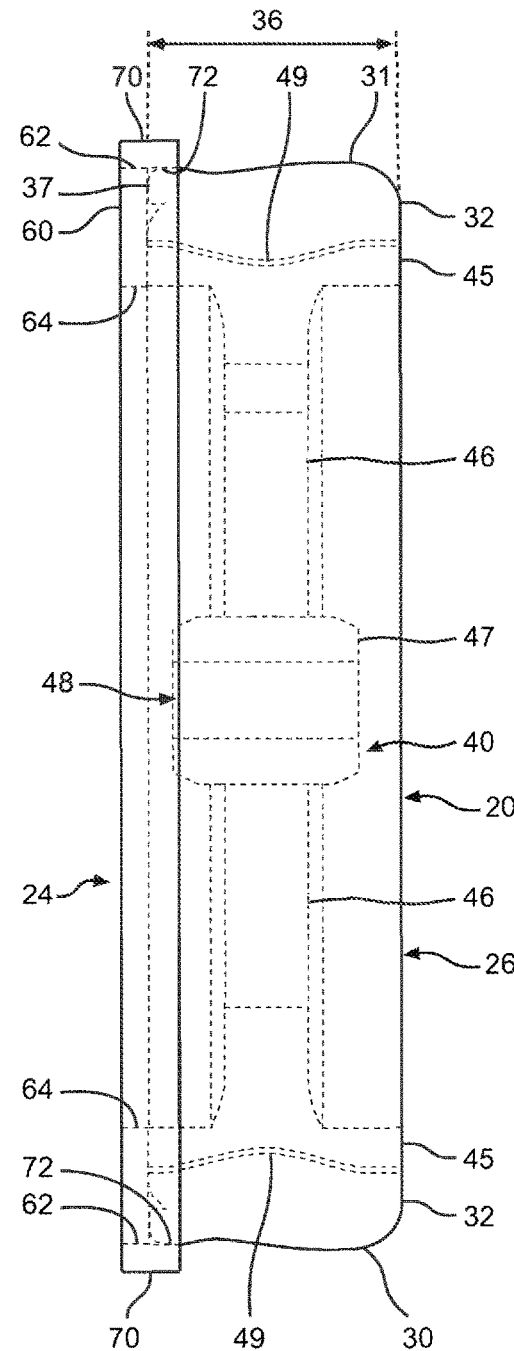
FIG. 9  FIG. 10

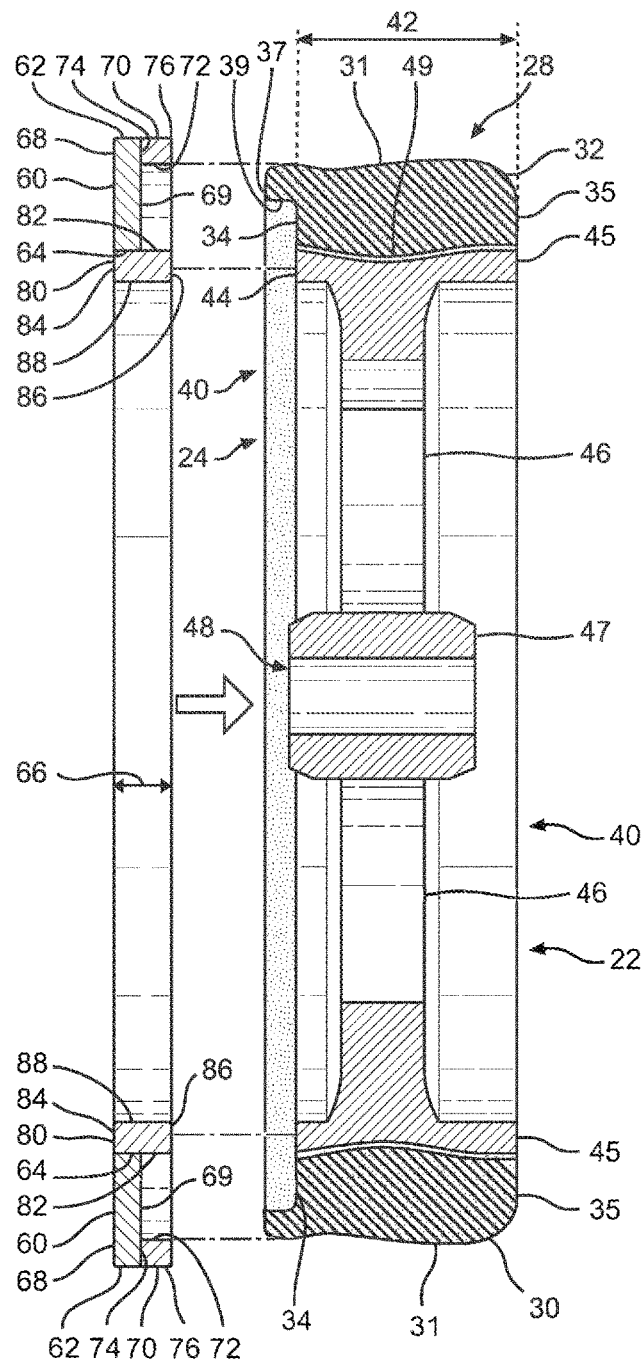
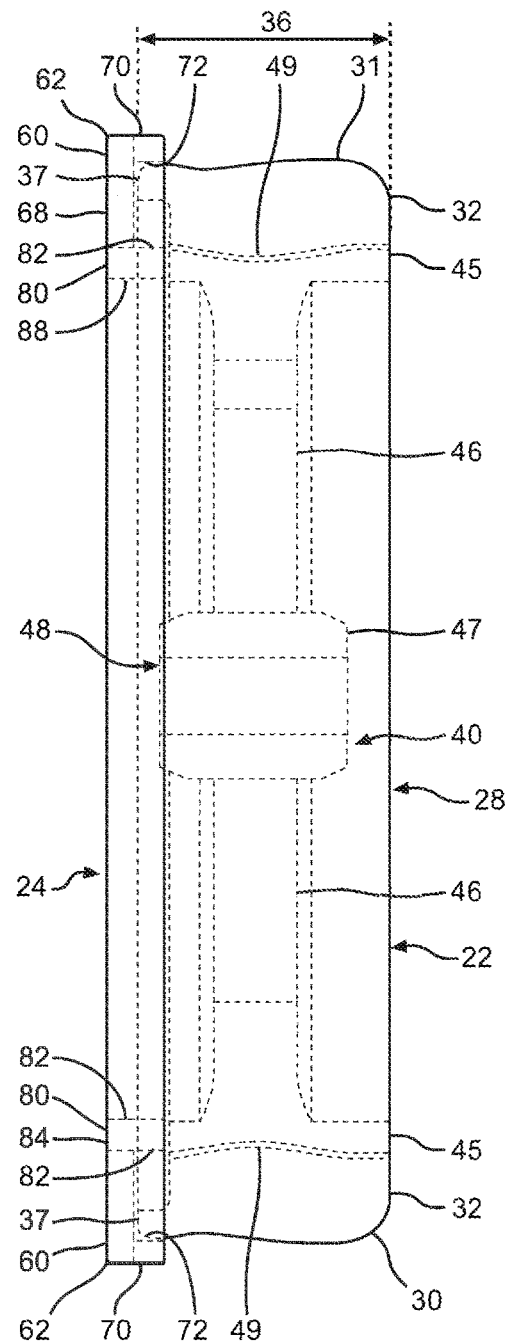
FIG. 13
FIG. 14

COMBINED DEPTH GAUGE WHEEL AND SCRAPER FOR A PLANTER

CROSS REFERENCE TO RELATED APPLICATIONS

The present application is a continuation of U.S. application Ser. No. 18/065,070 filed on Dec. 13, 2022 now issued as U.S. Pat. No. 11,707,013, which is a continuation of U.S. application Ser. No. 17/744,817 filed on May 16, 2022 now issued as U.S. Pat. No. 11,528,838, which is a continuation of U.S. application Ser. No. 17/399,556 filed on Aug. 11, 2021 now issued as U.S. Pat. No. 11,330,759. Each of the aforementioned patent applications, and any applications related thereto, is herein incorporated by reference in their entirety.

STATEMENT REGARDING FEDERALLY SPONSORED RESEARCH OR DEVELOPMENT

Not applicable to this application.

BACKGROUND

The described example embodiments in general relate to depth gauge wheels for row planters.

A depth gauge wheel positions a disk opener of a row planter so the disk blades of the disk opener cut a furrow into the ground at the proper depth to plant a seed. Prior to use, the depth gauge wheel is positioned close to and may even touch one of the disk blades. In use, the tire of the depth gauge wheel bumps into and occasionally rubs against the disk blade resulting in wear of the tire. As a result of wear, the tire of the depth gauge wheel must be replaced annually or at least every other year. Further, a scraper must be attached to the disk blade to scrape mud off of the disk blade. Farmers would benefit from a depth gauge wheel whose tire experiences less wear during use so that they last more than one or two planting seasons. Further, farmers would benefit from a depth gauge wheel capable of scraping mud off of the disk blade thereby eliminating the scraper.

SUMMARY

Some of the various embodiments of the present disclosure relate to a combined depth gauge wheel and scraper that can set the depth of a disk opener of a row planter and scrape the mud off of a disk blade of the disk opener. Some of the various embodiments of the present disclosure include a rim, a tire attached to the rim and a ring attached to the rim. The ring is positioned on an inner side of the rim and covers at least a portion of the inner side of the tire. The ring protects the inner side of the tire from wear and scrapes mud from the disk blade. The tire contacts the surface of the ground to set the cutting depth of the disk blade of the disk opener. In some embodiments, the tire includes a lip and the outer circumference of the ring is positioned in the inner circumference of the lip. In some other embodiments, the outer circumference of the ring extends past the outer circumference of the tire and a band, that is attached to the outer circumference of the ring, covers a portion of the tire. The ring and the band protect the inner side of the tire from wear and scrape mud from the disk blade.

There has thus been outlined, rather broadly, some of the embodiments of the present disclosure in order that the detailed description thereof may be better understood, and in order that the present contribution to the art may be better appreciated. There are additional embodiments of that will be described hereinafter and that will form the subject matter of the claims appended hereto. In this respect, before explaining at least one embodiment in detail, it is to be understood that the various embodiments are not limited in its application to the details of construction or to the arrangements of the components set forth in the following description or illustrated in the drawings. Also, it is to be understood that the phraseology and terminology employed herein are for the purpose of the description and should not be regarded as limiting.

To better understand the nature and advantages of the present disclosure, reference should be made to the following description and the accompanying figures. It is to be understood, however, that each of the figures is provided for the purpose of illustration only and is not intended as a definition of the limits of the scope of the present disclosure. Also, as a general rule, and unless it is evidence to the contrary from the description, where elements in different figures use identical reference numbers, the elements are generally either identical or at least similar in function or purpose.

BRIEF DESCRIPTION OF THE DRAWINGS

FIG. 9 is a cross-section view of the embodiment of the depth gauge wheel of FIG. 8.

FIG. 10 is a front view of the embodiment of the depth gauge wheel of FIG. 8 with the ring and band attached to the rim.

FIG. 13 is a cross-section view of another example embodiment of the depth gauge wheel.

FIG. 14 is a front view of the embodiment of the depth gauge wheel of FIG. 13 with the ring attached to the rim.

DETAILED DESCRIPTION

A. Overview

Figure 1:
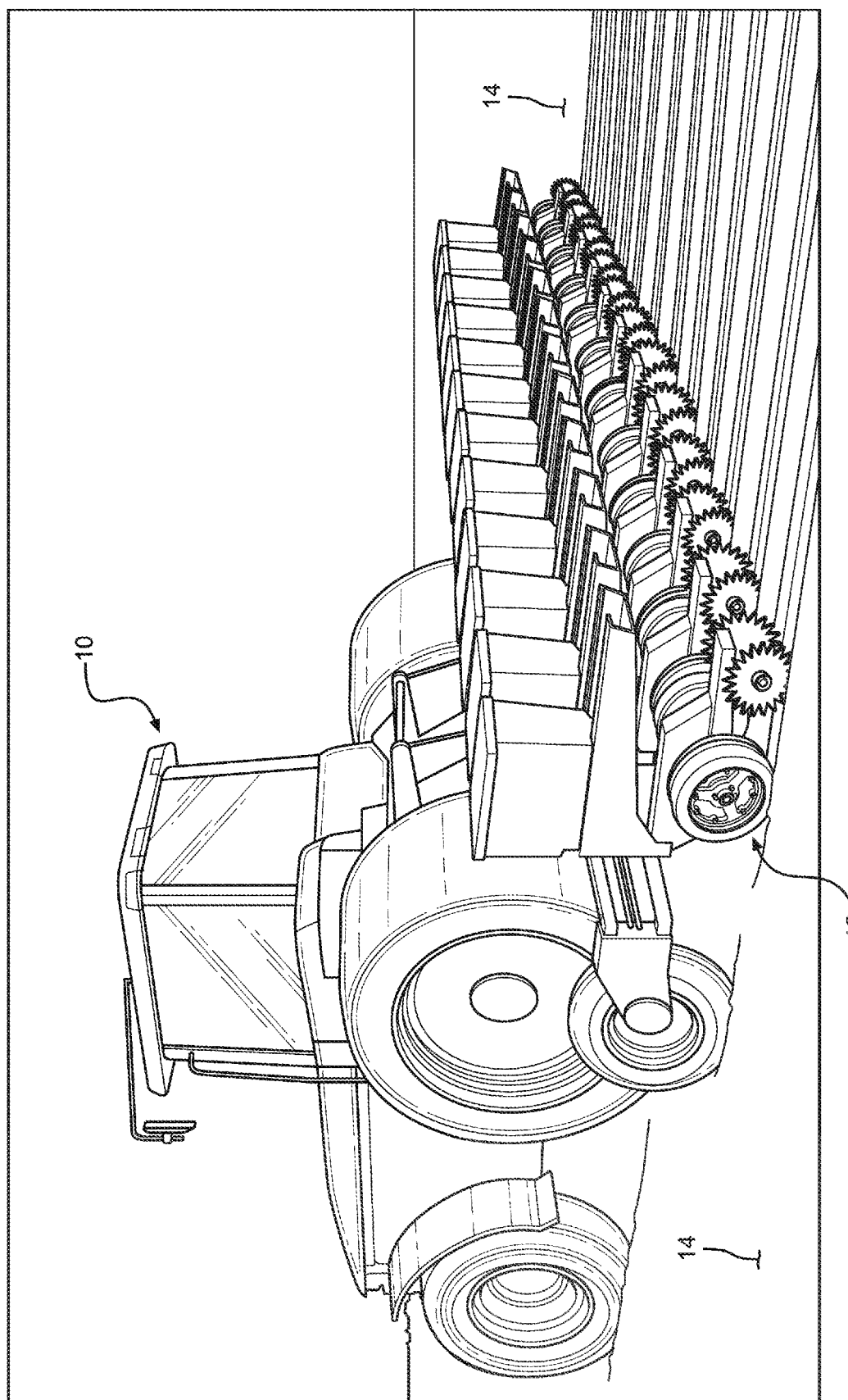
FIG. 1 is a perspective view of a tractor pulling a multi-row planter.
Figure 2:
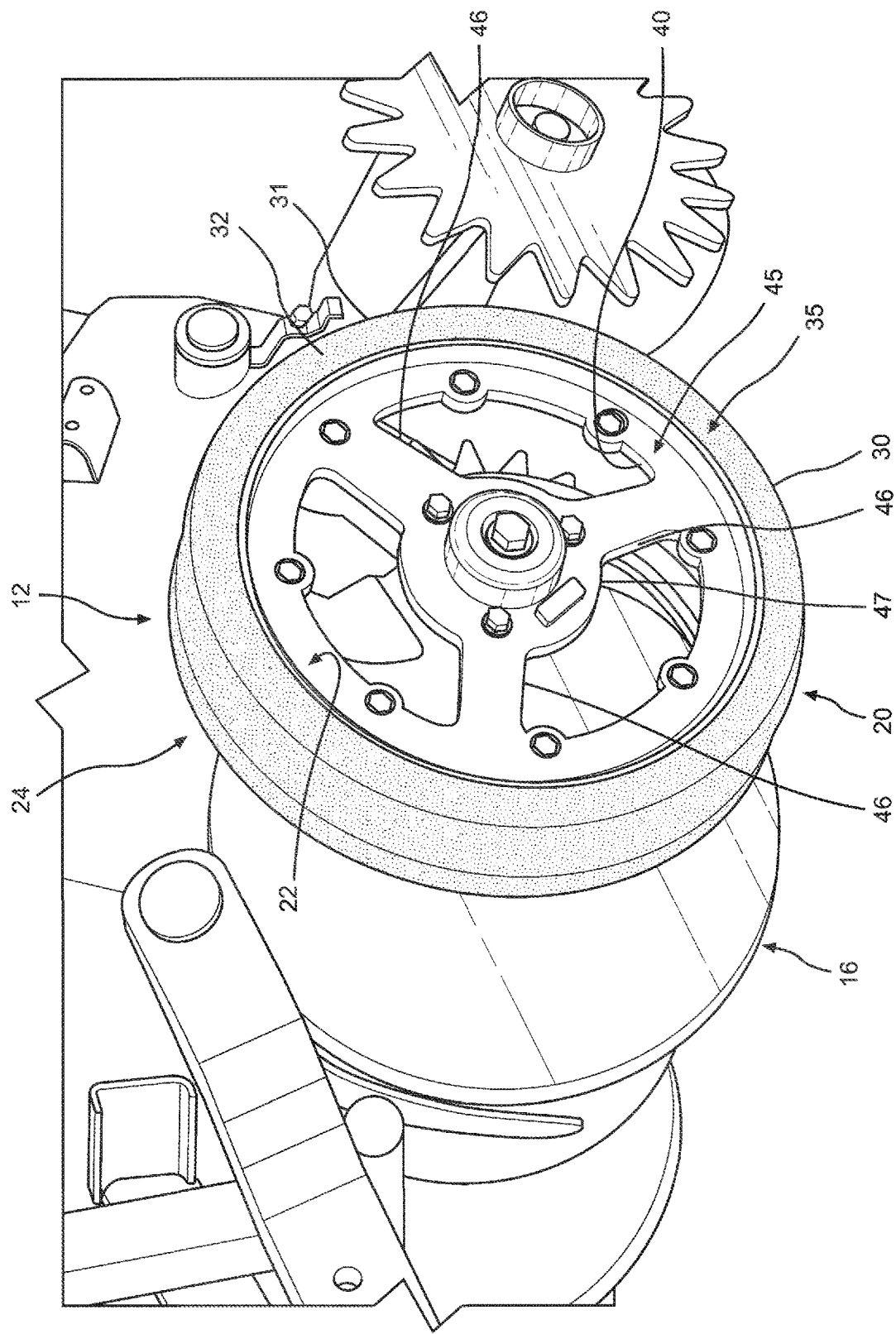
FIG. 2 is a perspective view of a row planter.
Figure 3:
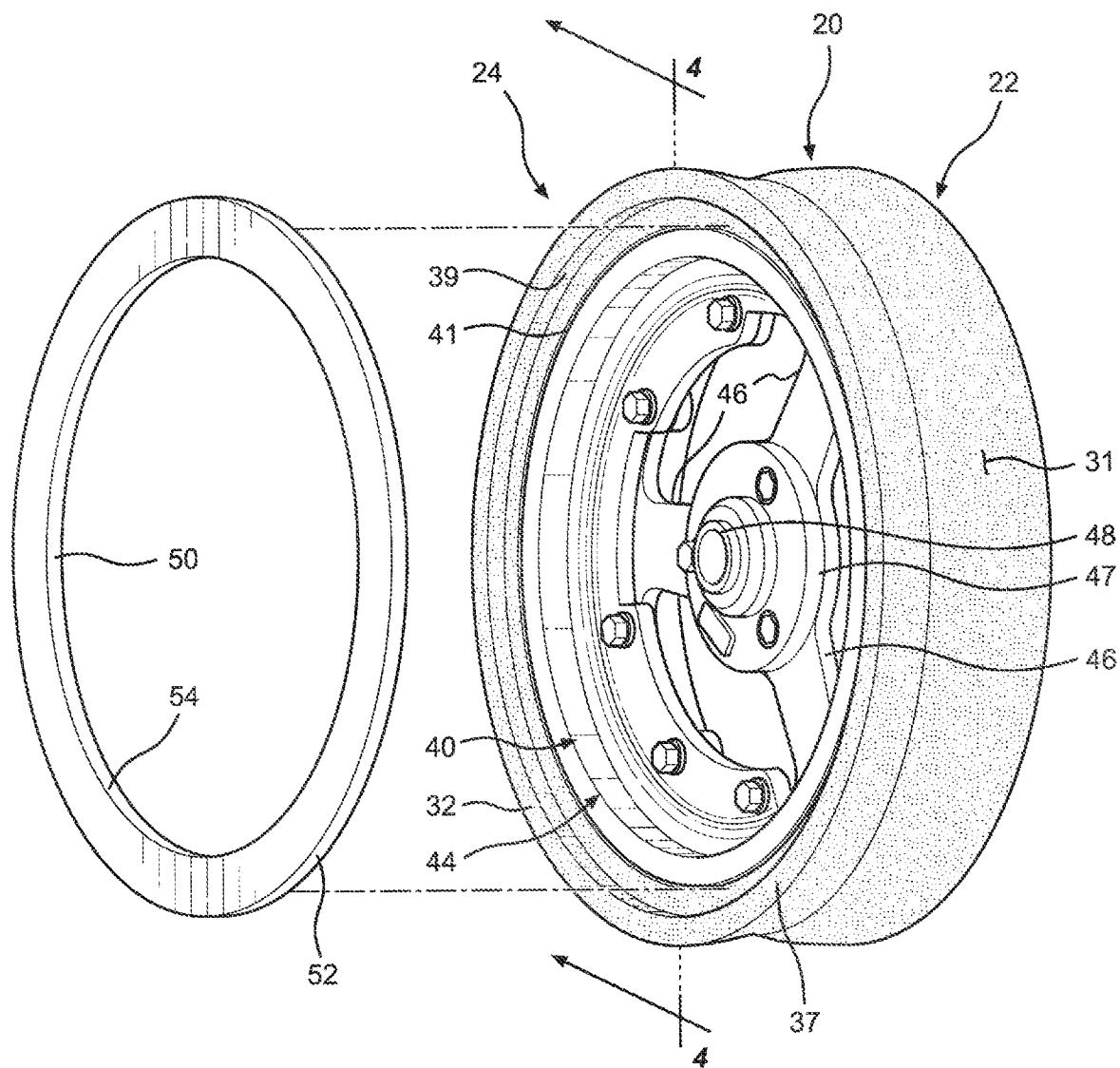
FIG. 3 is a perspective view of a depth gauge wheel in accordance with an example embodiment of the present disclosure with the ring separated from the rim for clarity of presentation.
Figure 4:
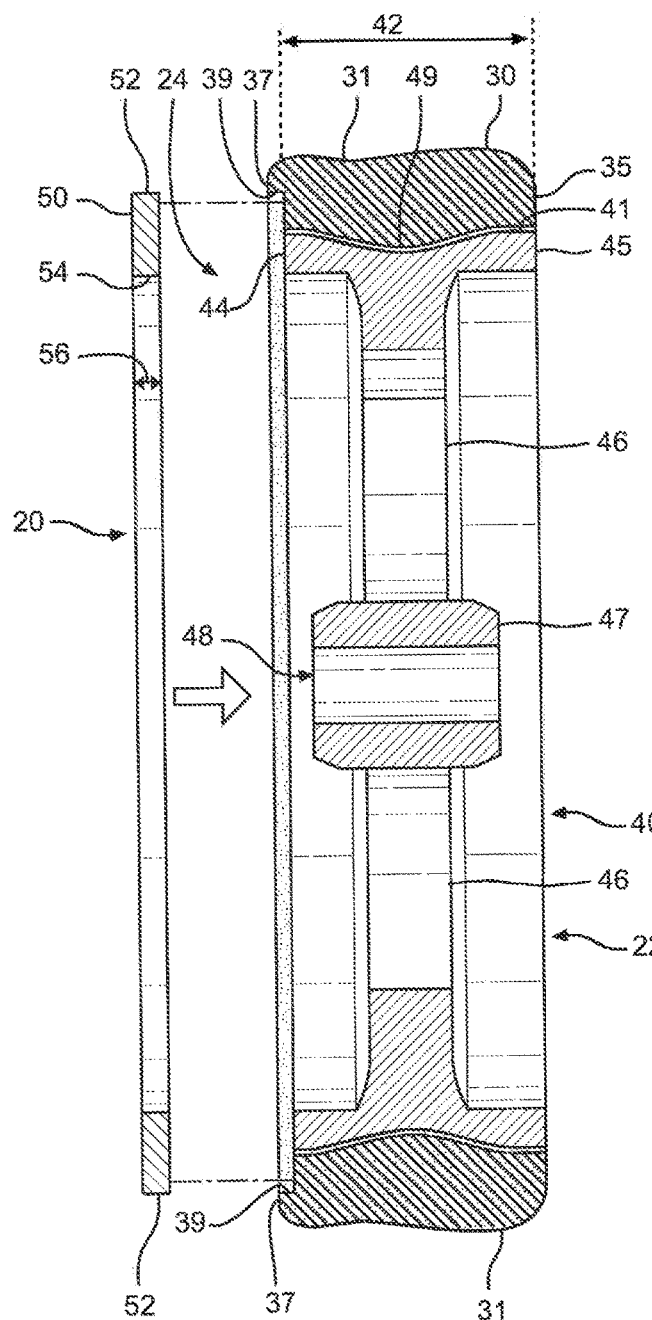
FIG. 4 is a cross-section view of the embodiment of the depth gauge wheel of FIG. 3.
Figure 5:
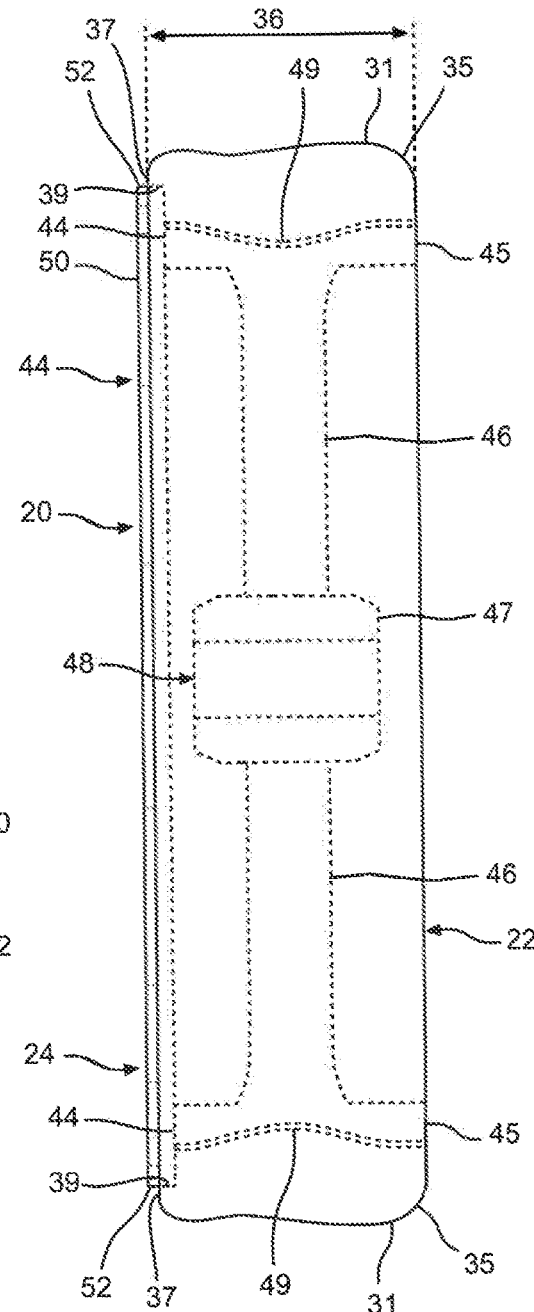
FIG. 5 is a front view of the embodiment of the depth gauge wheel of FIG. 3 with the ring attached to the rim.
Figure 6:
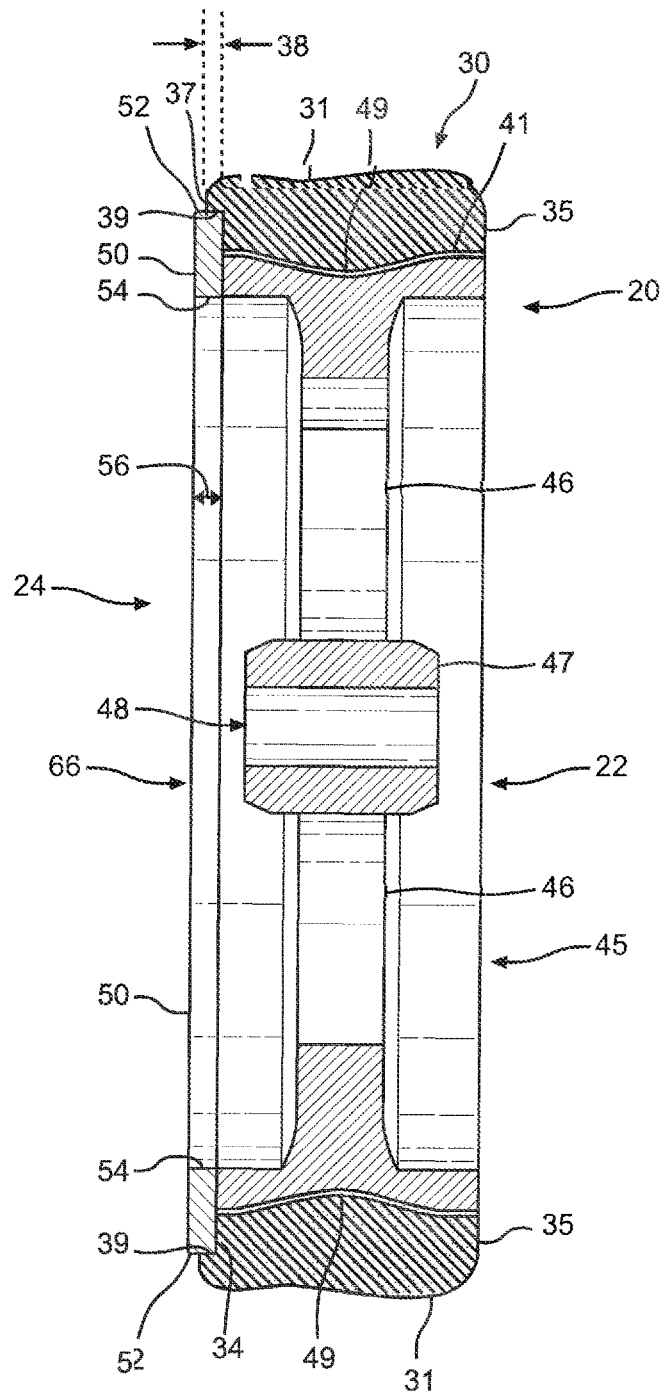
FIG. 6 is a is a cross-section view of the embodiment of the depth gauge wheel of FIG. 7.
Figure 7:
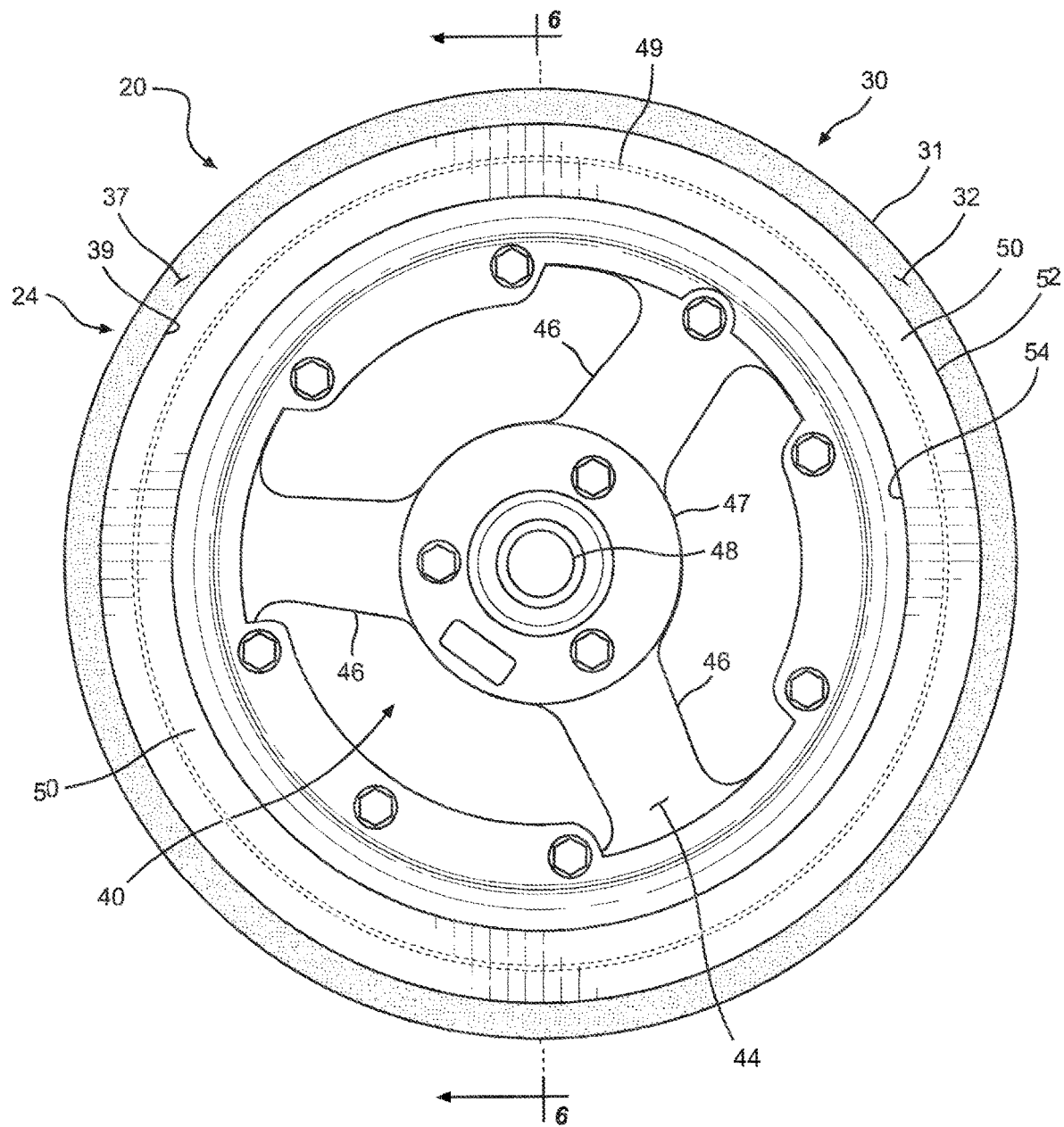
FIG. 7 is a side view of the embodiment of the depth gauge wheel of FIG. 3 with the ring attached to the rim.
Figure 8:
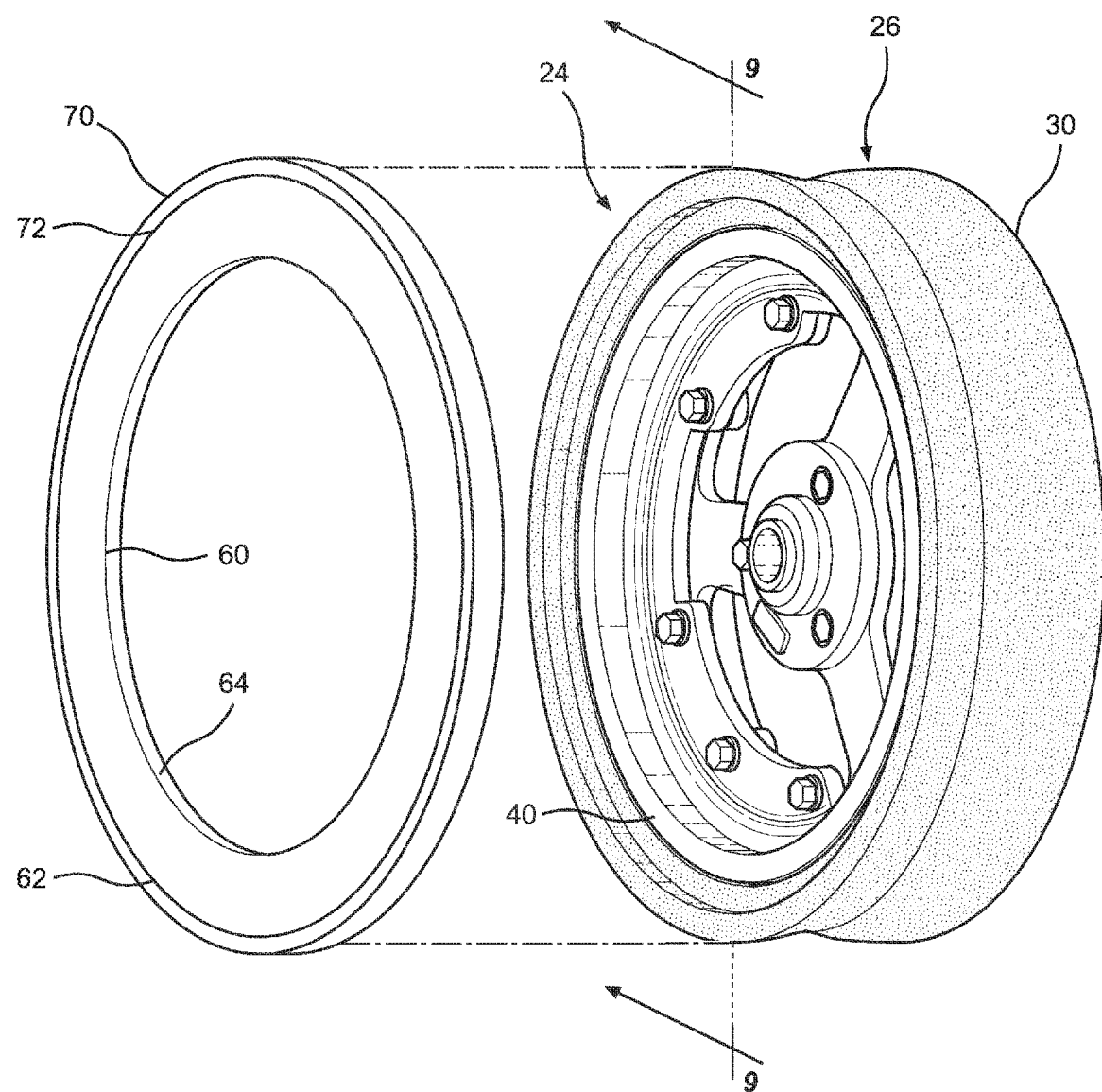
FIG. 8 is a is a perspective view of the depth gauge wheel in accordance with another example embodiment of the present disclosure with the ring and band separated from the rim for clarity of presentation.
Figure 11:
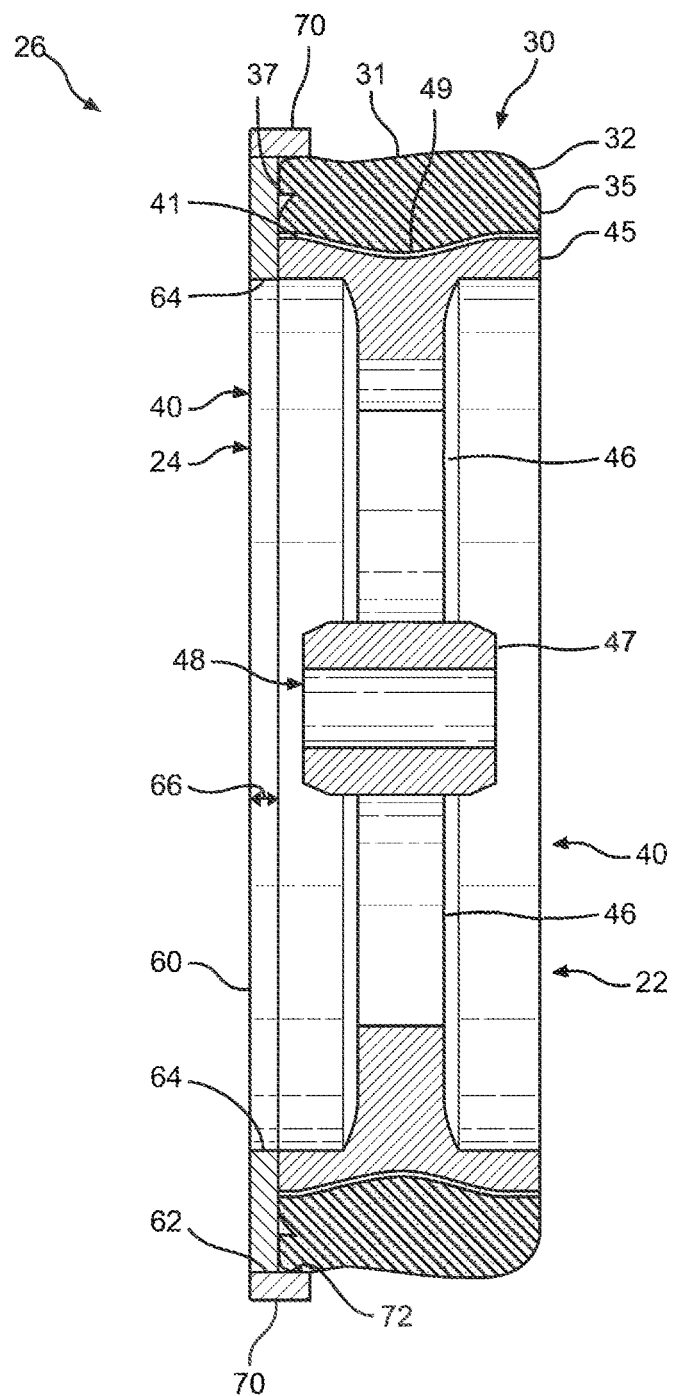
FIG. 11 is a cross-section view of the embodiment of the depth gauge wheel of FIG. 10.
Figure 12:
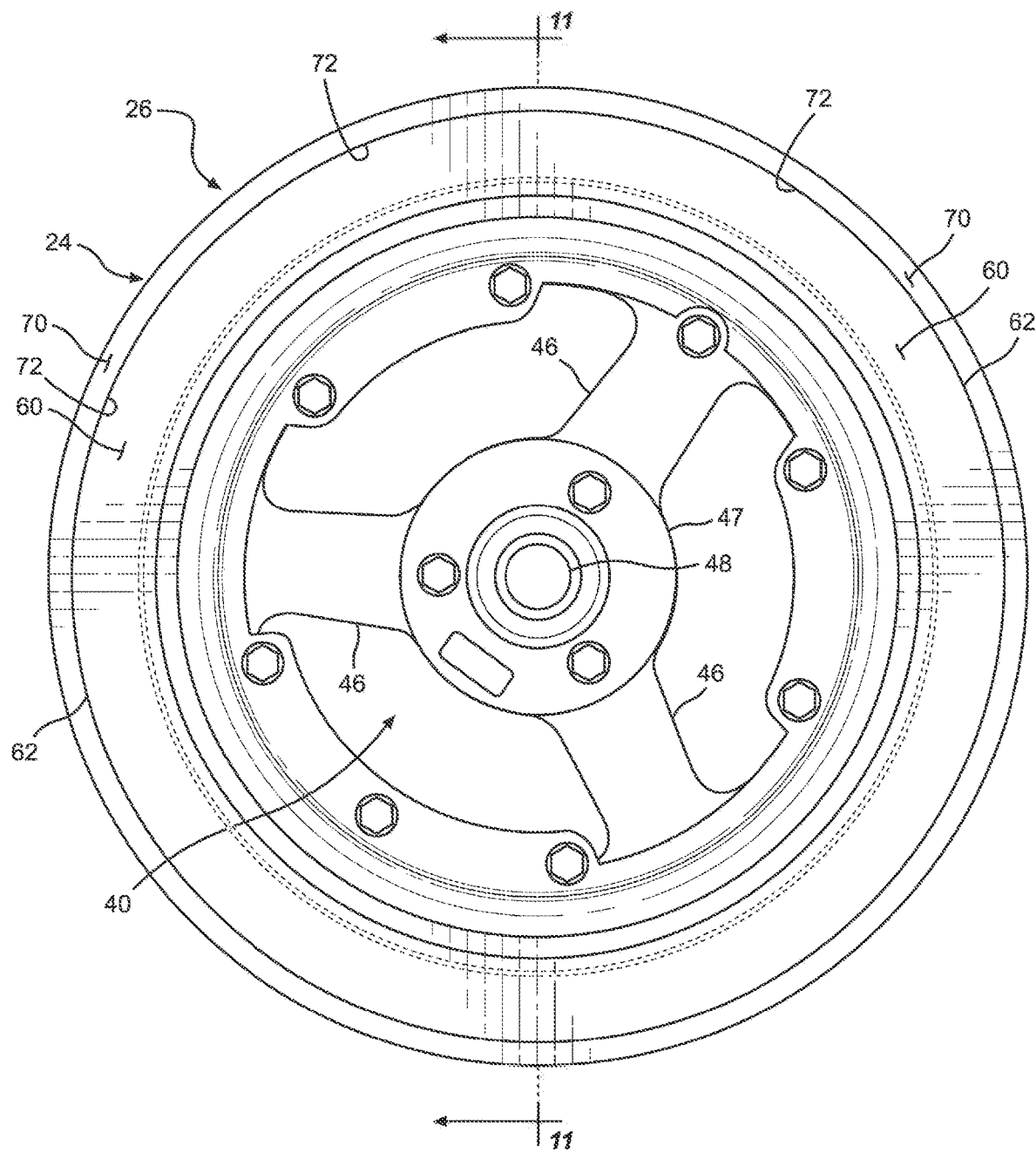
FIG. 12 is a side view of the embodiment of the depth gauge wheel of FIG. 11 with the ring and band attached to the rim.
Figure 15:
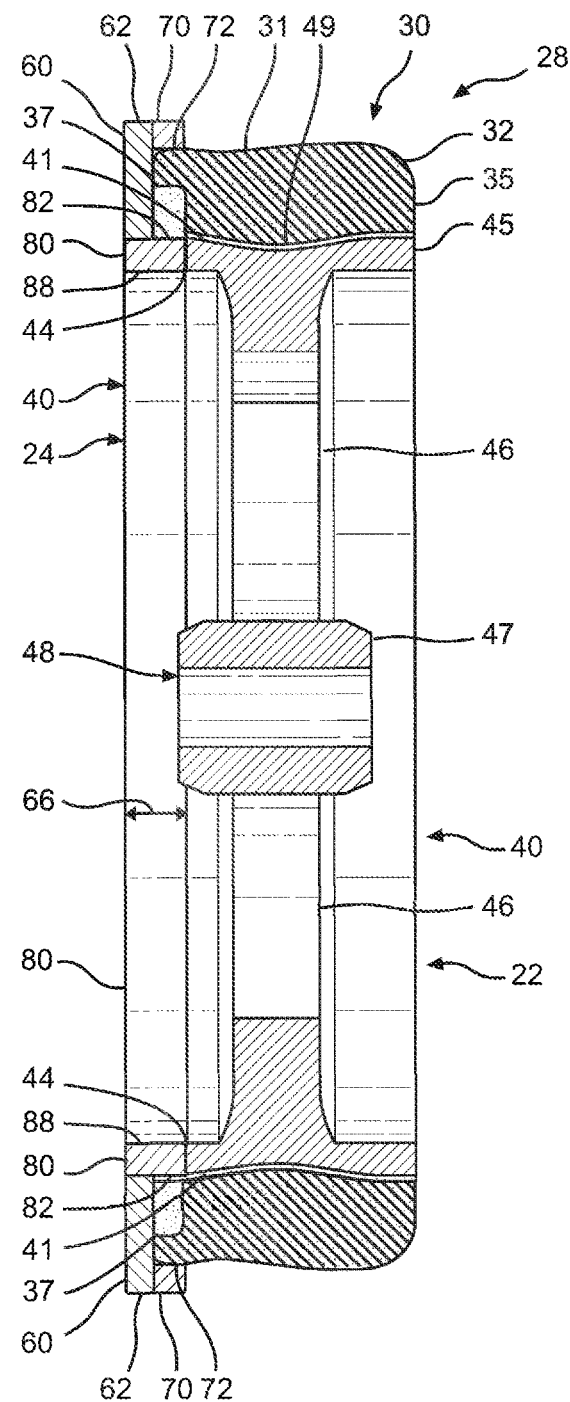
FIG. 15 is a cross-section view of the embodiment of the depth gauge wheel of FIG. 14.
Figure 16:
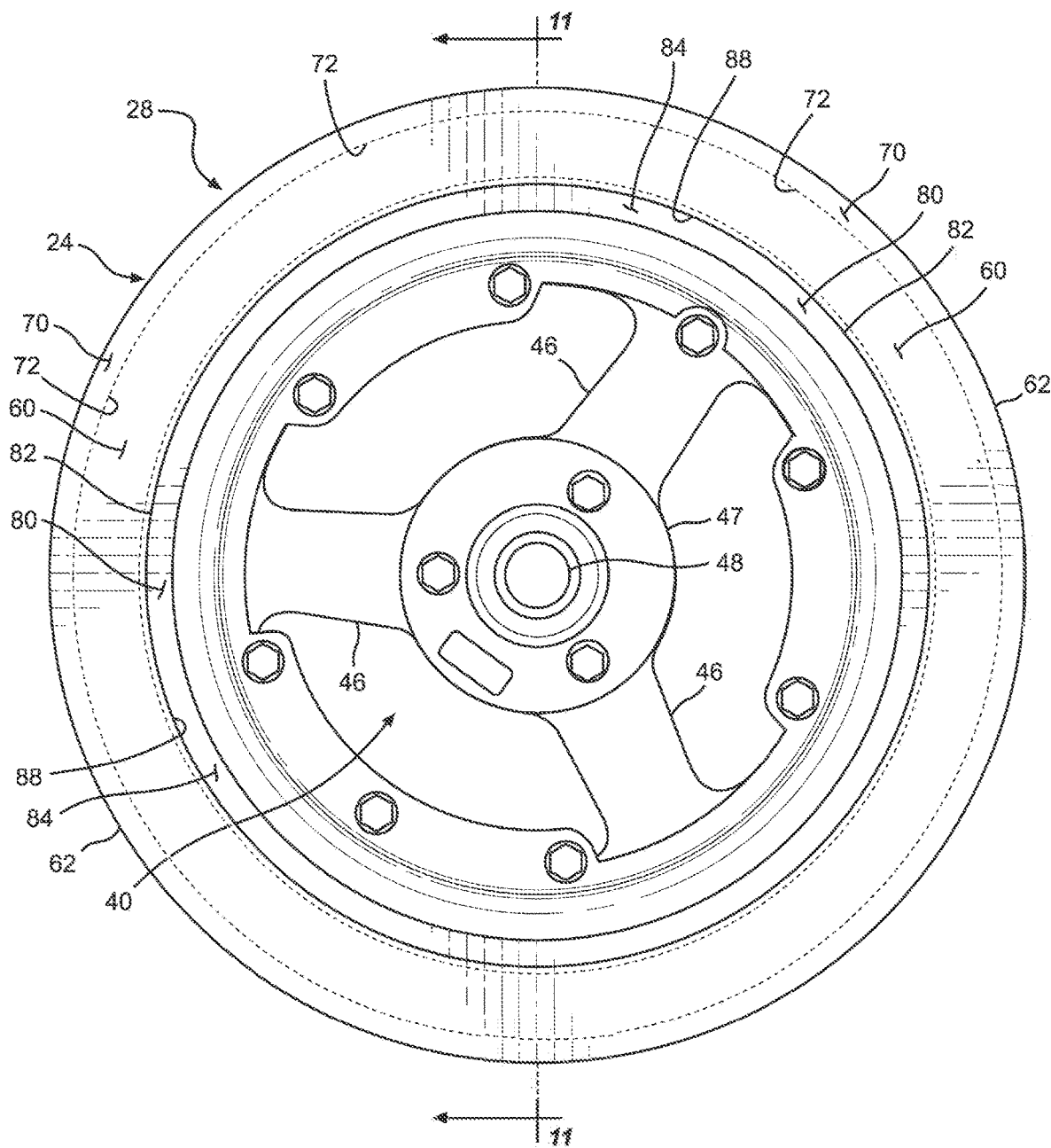
FIG. 16 is a side view of the embodiment of the depth gauge wheel of FIG. 15 with the ring attached to the rim.
Figure 17:
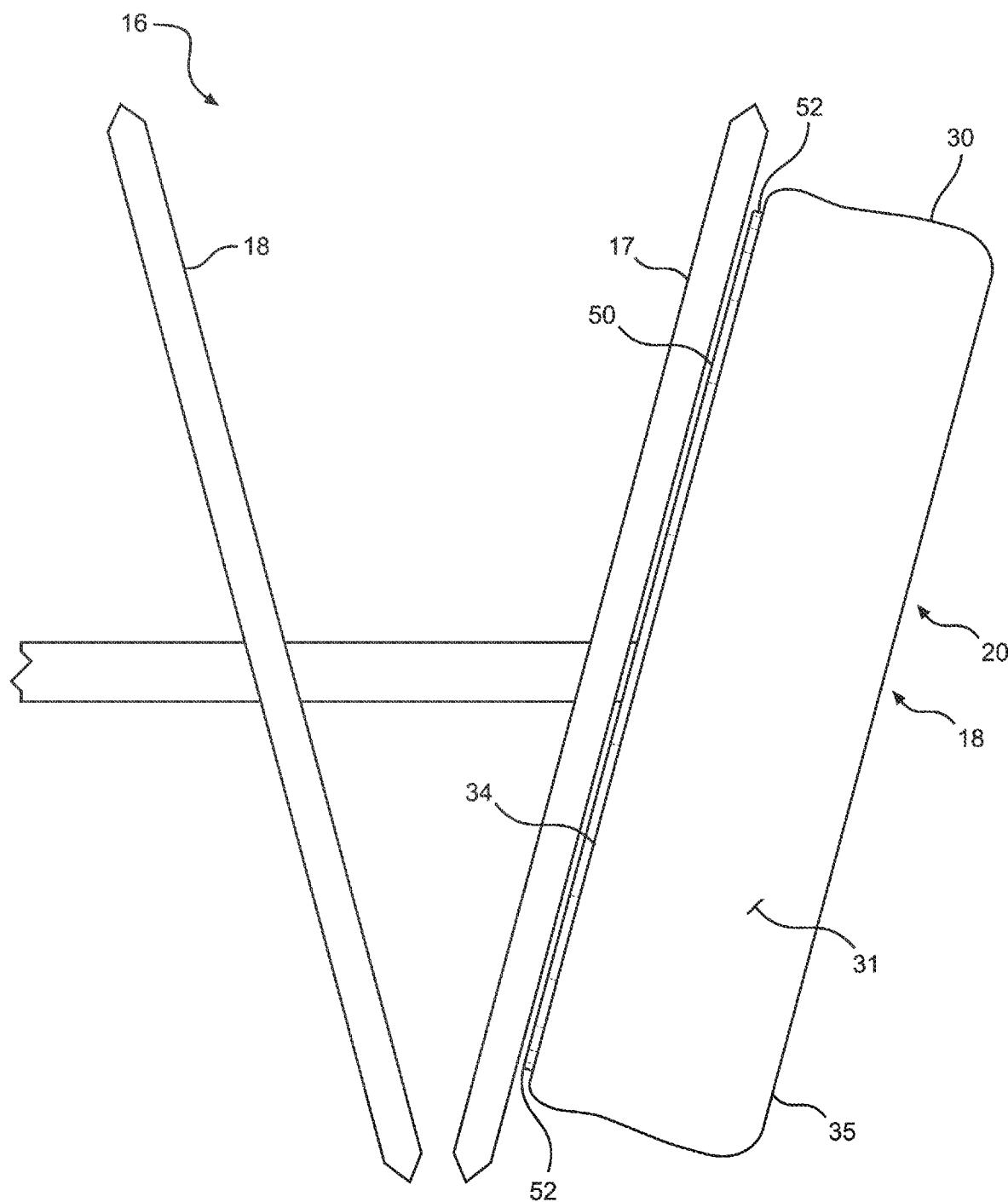
FIG. 17 is a top view of the embodiment of the depth wheel gauge of FIG. 3 positioned proximate to a disk blade of the disk opener of a row planter.
Figure 18:
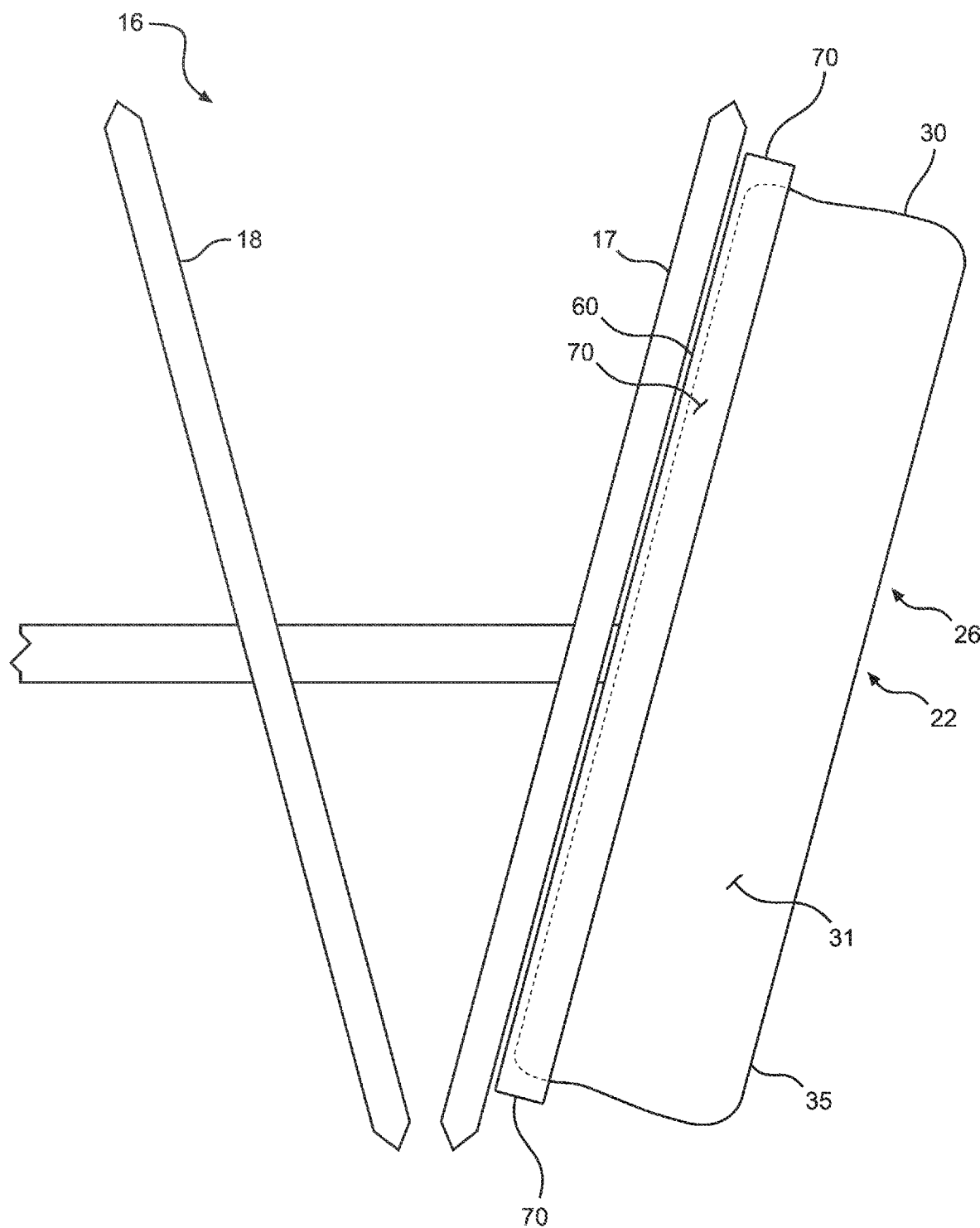
FIG. 18 is a top view of the embodiment of the depth wheel gauge of FIG. 8 positioned proximate to a disk blade of the disk opener of a row planter.

Some of the various embodiments of the present disclosure relate to a depth gauge wheel that can set the depth that a planter (e.g., row planter) plants a seed and scrape the mud from a disk blade of the disk opener of the row planter. A row planter includes a row cleaner, a depth gauge wheel, a disk opener (e.g., True V disk, seed opener), and a closer. The disk opener includes two disk blades that are positioned at an angle with respect to each other. The portions of the disk blades that are oriented in the forward direction are positioned close to each other while the portions of the disk blades that are oriented in the rearward direction are positioned further apart from each other thereby forming a V-shape.

As a tractor pulls the row planter across a field, the row cleaner removes debris from the ground where the seeds are to be planted. The depth gauge wheel rolls (e.g., travels, rotates) over the surface of the ground along the side of the row where the seeds will be planted. The disk opener is positioned with respect to the depth gauge wheel and with respect to the surface of the ground over which the depth gauge wheel travels. While the depth gauge wheel contacts the surface, the disk opener is positioned a predetermined depth into the ground. As the tractor pulls the planter across the ground, the V-shape arrangement of the disk blades cut into the ground and form a furrow of the predetermined depth. Since the depth gauge wheel positions the disk opener with respect to the surface of the ground, the furrow formed by the disk opener is the pre-determined depth.

Once the disk opener has opened the furrow, the planter drops a seed into the furrow. As the planter moves further forward, the closer closes the furrow so that the seed is covered with soil and positioned in the ground at the predetermined depth.

A planter may be a single row planter or a multirow planter. A multirow planter is a plurality of single row planters spaced apart from each other so that multiple rows may be planted at the same time. Each row planter of the multirow planter includes a respective row cleaner, depth gauge wheel, disk opener, and closer.

Using a planter in moist or muddy ground may be challenging because the mud tends to stick to the disk blades of the disk opener. Mud stuck on the disk blades may interfere with the operation of the disk opener and thereby with formation of the furrow at the predetermined depth for planting the seed. A scraper may be used to scrape mud from the disk blades; however, the combined depth gauge wheel and scraper of the present disclosure provide distinct advantages with respect to tire wear and mud scraping. In an example embodiment, the depth gauge wheel for a planter includes a rim, a tire attached to the rim and a ring attached to the rim. The ring protects the tire from wear and scrapes mud from the disk blade. The tire contacts the surface of the ground to set the cutting depth of the disk blade. In another example embodiment, the depth gauge wheel for a planter includes a rim, a tire attached to the rim, a ring attached to the rim and a band attached to the ring. The ring and the band protect the tire from wear and scrape mud from the disk blade. The tire contacts the surface of the ground to set the cutting depth of the disk blade.

B. Rim and Tire

A depth gauge wheel 20, 26, and 28 of the present disclosure includes, inter alia, a rim 40 and a tire 30. The rim 40 is the inner portion of the depth gauge wheel 20 and the tire 30 is the outer portion of the depth gauge wheel 20 that contacts the surface of the ground 14. The depth gauge wheel 20 has an outer side 22 and an inner side 24.

The rim 40 includes a hub 47, a center bore 48 and a drop surface 49 to which the tire 30 attaches. The rim 40 and the tire 30, and therefore depth gauge wheel 20, 26, and 28, rotates around the center bore 48. The rim 40 has an inner side 44 and an outer side 45. The rim 40 has a width 42. In general, the width 42 is the distance between the inner side 44 and the outer side 45. The rim 40 has an outer circumference 41. The rim 40 may be a solid rim or a rim that has spokes 46 that connect the hub 47 to the outer portion of the rim 40.

The tire 30 is attached to the rim 40. The tire 30 is attached around the rim 40. The tire 30 is attached to the drop surface 49, to the rim 40 between the sides of the drop surface 49 and/or to the outer circumference 41 of the rim 40. The tire 30 has an inner side 34 and an outer side 35. The tire 30 includes an outer circumference 31. The tire 30 includes a width 36. The outer circumference 31 of the tire 30 contacts the surface of the ground 14 as the depth gauge wheel 20, 26, and 28 rolls over the ground 14. The outer circumference 31 may be smooth or textured. The tire 30 includes a sidewall 32. The sidewall 32 corresponds to the inner side 34 and the outer side 35 of the tire 30. While the tire 30 is attached to the rim 40, the inner side 34 of the tire 30 is positioned on an inner side 44 of the rim 40, and the outer side 35 of the tire 30 is positioned on the outer side 45 of the rim 40. The tire 30 may be solid or pneumatic.

The tire 30 may include a lip 37. In an example embodiment, the tire 30 includes the lip 37 around the inner side 34 of the tire 30. The lip 37 extends from the inner side 34 of the tire 30 outward away from the inner side 34 of the tire 30. The height 38 of the lip 37 is the distance the lip 37 extends away from the inner side 34. The lip 37 may go around the entire circumference of the inner side 34 of the tire 30. The lip 37 includes an outer circumference. The lip 37 includes an inner circumference 39. The outer circumference of the lip 37 may be coextensive with an outer circumference 31 of the tire 30 that contacts the surface of the ground 14. While the tire 30 is attached to the rim 40, the lip 37 is positioned on the inner side 44 of the rim 40.

In an example embodiment, the tire 30 is formed of rubber. In an example embodiment, the tire 30 is formed of rubber and is solid. In an example embodiment, tire 30 is formed of rubber and is pneumatic.

C. Ring and Band

An example embodiment of the depth gauge wheel 20 of the present disclosure further includes a ring 50. Another example embodiment of the depth gauge wheel 26 of the present disclosure further includes a ring 60 and a band 70.

In an example embodiment, the ring 50 has a circular shape, an outer circumference 52 and an inner circumference 54. The ring 50 is substantially planar. The ring 50 has a thickness 56. The ring 50 is attached to the inner side 44 of the rim 40. The tire 30 abuts the ring 50. In an example embodiment, while the ring 50 is attached to the inner side 44 of the rim 40, the outer circumference 52 of the ring 50 is positioned inside the inner circumference 39 of the lip 37. The ring 50 protects the inner side 34 of the tire 30 from wear through contact with the disk blade 17 of the disk opener 16. The ring 50 is adapted to scrape mud from the disk blade 17.

As discussed above, the tire 30 may include the lip 37. In an example embodiment, the lip 37 has the height 38. The ring 50 has the thickness 56. The thickness 56 of the ring 50 is greater than the height 38 of the lip 37, so the ring 50 extends past the lip 37 thereby protecting the lip 37 from wear. In another example embodiment, the lip 37 extends a first distance away from the inner side 34 of the tire 30. The ring 50 extends a second distance away from the inner side 34 of the tire 30. The second distance is greater than the first distance. As a result, the ring 50 extends past the lip 37 thereby protecting the lip 37 from wear.

Because the ring 50 covers a portion of the tire 30 and is coextensive with or extends past the lip 37, the ring 50, as opposed to the inner side 34 of the tire 30 and/or the lip 37, comes into contact with the disk blade 17, so the ring 50 protects the tire 30 from wear through contact with the disk blade 17. Further, because the ring 50 contacts the disk blade 17, the ring 50 scrapes mud from the disk blade 17.

In an example embodiment, the rim 40 and the ring 50 are formed of a metal. The ring 50 is welded to the inner side 44 of the rim 40 to attached the ring 50 to the rim 40.

In another example embodiment, the ring 60 has a circular shape, the outer circumference 62 and an inner circumference 64. The ring 60 is substantially planar. The ring 60 has a thickness 66. The ring 60 is attached to the inner side 44 of the rim 40. The ring 60 is positioned on the inner side 34 of the tire 30. The outer circumference 62 of the ring 60 is positioned past the outer circumference 31 of the tire 30. The tire 30 abuts the ring 60. The ring 60 protects the inner side 34 of the tire 30 from wear through contact with the disk blade 17 of the disk opener 16. The ring 60 is adapted to scrape mud from the disk blade 17. Because the ring 60 extends from the rim 40 across the sidewall 32 of the tire 30 to or past (e.g., beyond) the outer circumference 31 of the tire 30, the ring 60 covers the inner side 34 of the tire 30.

The band 70 includes an inner circumference 72. The band 70 attached to the ring 60. The inner circumference 72 of the band 70 is attached around the outer circumference 62 of the ring 60. The band 70 encircles the ring 60. Because the ring 60 is attached to the inner side 44 of the rim 40 and the band 70 encircles the ring 60, the band 70 also encircles the tire 30. The band 70 covers a portion of a width 36 of the tire 30 including the area where the tire 30 abuts the ring 60. Because the band 70 covers the area where the lip 37 abuts the ring 60, the band 70 prevent mud from squeezing between the tire 30 and the ring 60.

Because the ring 60 and the band 70 cover the inner side 34 of the tire 30, the ring and the band 70 contact with the disk blade 17 so the ring 60 and the band 70 protect the tire 30 from wear through contact with the disk blade 17. Because the ring 60 and the band 70 coming to contact with the disk blade 17, the ring 60 and the band 70 scrape mud from the disk blade 17.

As discussed above, the tire 30 may include the lip 37. As further discussed above, the outer circumference 62 of the ring 60 extends past the outer circumference 31 of the tire 30, so the ring 60 covers the inner side 34 of the tire 30 and the lip 37. In an example embodiment that includes the lip 37 and the ring 60, the lip 37 abuts the ring 60. In an example embodiment, the ring 60 compresses the lip 37 because the ring 60 is attached to the inner side 44 of the rim 40.

In another example embodiment, the rim 40 and the ring 60 are formed of a metal. The ring 60 is welded to the inner side 44 of the rim 40 to attached the ring 50 to the rim 40. In an example embodiment, the ring 60 and the band 70 are formed of a metal. The band 70 is welded to the outer circumference 62 of the ring 60 to attach the band 70 to the ring 60.

D. Disk Blade

As discussed above, as the tractor 10 pulls the planter across the ground 14, the depth the disk opener 16 cuts into the ground 14 is determined by the depth gauge wheel 20, 26, and 28. In an example embodiment, the inner side 44 of the rim 40, the inner side 34 of the tire 30 and the ring 50 are positioned proximate to the disk blade 17 of the planter 12. In another example embodiment, the inner side 44 of the rim 40, the inner side 34 of the tire 30, the ring 60 and the band 70 are positioned on a side of the disk blade 17 of the planter 12. The ring 60 is positioned proximate to the disk blade 17.

In an example embodiment, the inner side 44 of the rim 40, the inner side 34 of the tire 30 and the ring 50 are positioned parallel to the surface of the disk blade 17 or disk blade 18. In an example embodiment, the inner side 44 of the rim 40, the inner side 34 of the tire 30 and the ring 60 and an edge of the band 70 are positioned parallel to the surface of the disk blade 17. The depth gauge wheel 20, 26, and 28 may be positioned at an angle with respect to the disk blade 17 or 18; however, at least a portion of the ring 50 or the ring 60 must be proximate to the disk blade 17 or 18 to scrape mud from the disk blade 17 or 18.

In all embodiments of the depth gauge wheel 20, 26, and 28, the tire 30 contacts a surface of the ground 14 to set the cutting depth of the disk blade (e.g., 17 and 18) into the ground 14 to open a furrow to plant a seed. As discussed above, the cutting depth of the disk opener 16 is set with respect to the depth gauge wheel 20, 26, and 28 and with respect to the surface of the ground 14 over which the gauge wheel 20, 26, and 28 travels. So, contact of the tire 30 with the surface of the ground 14 over sets the cutting depth of the disk opener 16, and therefore the cutting depth of the disk blade 17 and the disk blade 18. The edges of the disk blades 17 and 18 are relatively narrow (e.g., sharp), so the disk blades 17 and 18 cut into the ground 14. The V-shaped arrangement of the disk blade 17 with respect to the disk blade 18 causes the disk blades 17 and 18 to cut into the ground 14 and to push the soil away from a centerline thereby forming the furrow.

E. First Embodiment

A first embodiment of the depth gauge wheel 20 includes a rim 40 having an inner side 44, a tire 30 having a lip 37 around an inner side 34 thereof and a ring 50 having a circular shape and the outer circumference 52. The lip 37 has an inner circumference 39. The tire 30 is attached to the rim 40 with the lip 37 positioned on the inner side 44 of the rim 40. The ring 50 is attached to the inner side 44 of the rim 40 to position the outer circumference 52 of the ring 50 inside the inner circumference 39 of the lip 37. The inner side 44 of the rim 40, the inner side 34 of the tire 30 and the ring 50 are positioned proximate to the disk blade 17 of the disk opener 16 of the planter 12. The tire 30 sets the cutting depth of the disk blade 17 into the ground 14 to open a furrow to plant the seed. The ring 50 protects the inner side 34 of the tire 30 from wear through contact with the disk blade 17. The ring is adapted to scrape mud from the disk blade 17.

The thickness 56 of the ring 50 may be such that the ring 50 extends past (e.g., further than) the lip 37. As the depth gauge wheel 20 bumps against the disk blade 17, the ring 50 comes into contact with the disk blade 17 rather than the lip 37. If the ring 50 is formed of a durable material, such as a metal, the ring 50 will bear the wear caused by rubbing with the disk blade 17 rather than the lip 37 of the tire 30.

In an embodiment, the ring 50 is formed of a metal and extends further away from the depth gauge wheel 20 than the lip 37. The tire 30 and the lip 37 are formed of rubber. So, since the durable material of ring 50 is incompressible and comes into contact with the disk blade 17 before the lip 37 can come into contact with the disk blade 17, the ring 50 reduces the wear on the lip 37 and any other portion of the tire 30 especially the portions of the tire 30 that are covered by the ring 50.

Because the ring 50 is positioned proximate to the disk blade 17, it rubs against the disk blade 17 to knock any mud off of the disk blade 17. Further, because the outer circumference 52 of the ring 50 comes into contact with the mud, when the ring 50 pushes the mud off from the disk blade 17, the mud is pushed around the outer circumference 52 of the ring 50 so it tends to fall to the ground 14. Generally, the mud does not move between the ring 50 and the disk blade 17 or between the rim 40 and the disk blade 17. Pushing the mud off of the disk blade 17 using the outer circumference 52 of the ring 50 reduces clogging from mud. Mud may be further pushed away from the disk blade 17 by the outer surface of the ring 50.

F. Second Embodiment

A second embodiment of the depth gauge wheel 26 includes a rim 40 having an inner side 44, a tire 30 having an inner side 34 and an outer circumference 31, a ring 60 having a circular shape and the outer circumference 62 and the band 70. The tire 30 is attached to the rim 40. The ring 60 is attached to the inner side 44 of the rim 40. The outer circumference 62 of the ring 60 is positioned past the outer circumference 31 of the tire 30. The band 70 is attached to the ring 60 around the outer circumference 62 of the ring 60. The band 70 encircles the ring 60 and the tire 30. The band 70 covers a portion of a width 36 of the tire 30 including an area where the tire 30 abuts the ring 60. The inner side 44 of the rim 40, the inner side 34 of the tire 30, the ring 60 and the band 70 are positioned on a side of the disk blade 17 of the disk opener 16 of the planter 12. The ring 60 is positioned proximate to the disk blade 17. The tire 30 sets the cutting depth of the disk blade 17 into the ground 14 to open a furrow to plant the seed. The ring 60 and the band 70 protect the inner side 34 of the tire 30 from wear through contact with the disk blade 17. The ring 60 and the band 70 are adapted to scrape mud from the disk blade 17.

In an embodiment, the ring 60 covers the sidewall 32 on the inner side 34 of the tire 30 completely. Further, the band 70 covers a portion of the width 36 of the tire 30 closest to the inner side 34 of the tire 30. As a result, the tire 30 does not come into contact with the disk blade 17, so wear of the tire 30 is significantly reduced if not completely eliminated. The ring 60 and the band 70 may protect a tire 30 formed of rubber from most if not all wear.

Further, the side of the ring 60 and the band 70 are positioned proximate to the disk blade 17 to push against and scrape off any mud that sticks to the disk blade 17. The outer edge of the band 70 pushes against the mud to knock it away from the tire 30 and not between the ring 60 and the disk blade 17.

G. Third Embodiment

A third embodiment of the depth gauge wheel 20 includes a rim 40 having an inner side 44, a tire 30 having an inner side 34, and a ring 50 having a circular shape and the outer circumference 52. The tire 30 is attached to the rim 40. The ring 50 is attached to the inner side 44 of the rim 40. The inner side 44 of the rim 40, the inner side 34 of the tire 30 and the ring 50 are positioned proximate to the disk blade 17 of the disk opener 16 of the planter 12. The tire 30 sets the cutting depth of the disk blade 17 into the ground 14 to open a furrow to plant the seed. The ring 50 protects the inner side 34 of the tire 30 from wear through contact with the disk blade 17. The ring 50 is adapted to scrape mud from the disk blade 17.

The third embodiment functions similarly to the first embodiment with respect to protecting the tire 30 from wear and for scraping mud from the disk blade 17.

H. Fourth Embodiment

A fourth embodiment of the depth gauge wheel 28 includes a rim 40, a tire 30, a ring 60, a band 70 and a band 80. The rim 40 has an inner side 44. The tire 30 has an inner side 34 and an outer circumference 31. The ring 60 has a circular shape, an inner circumference 64, an outer circumference 62, an outer side 69 and an inner side 68. The band 70 has an inner circumference 72, an inner edge 74 and an outer circumference 76. The band 80 has an outer circumference 82, an inner edge 84, an outer edge 86 and an inner circumference 88.

The tire 30 is attached to the rim 40. In an example embodiment, the inner side 34 of the tire 30 extends past the inner side 44 of the rim 40. In another example embodiment, the inner side 34 of the tire 30 is flush with the inner side 44 of the rim. In an example embodiment, the inner circumference 64 of the ring 60 is attached to the outer circumference 82 of the band 80. The inner edge 84 of the band 80 is flush with the inner side 68 of the ring 60. The inner edge 74 of the band 70 is attached to the outer side 69 of the ring 60. In another example embodiment, the inner edge of the band 80 connects to the outer side 69 of the ring 60. The inner circumference 64 of the ring 60 is flush with the inner circumference 88 of the band 80. The inner circumference 72 of the band 70 connects to the outer circumference 62 of the ring 60. The inner edge 74 of the band 70 is flush with the inner side 68 of the ring 60. Regardless of how the band 70 and the band 80 are positioned relative to and connected to the ring 60, the band 80 is positioned closer to the center bore 48 then the band 70. As is discussed below, the band 70 encircles the outer circumference 31 of the tire 30 and covers at least a portion of the width 36 of the tire 30. As further discussed below, the band 80 connects to the rim 40.

In an example embodiment, the band 80 is attached to the ring 60 around the inner circumference 64 of the ring 60. The band 80 is attached to the inner side 44 of the rim 40 to attach the ring 60 to the rim 40. In an example embodiment, the inner edge 84 of the band 80 is connected to the ring 60 and the outer edge 86 of the band 80 is attached to the inner side 44 of the rim 40 thereby attaching the ring 60 to the rim 40. The outer circumference 62 of the ring 60 is positioned past (e.g., above) the outer circumference 31 of the tire 30. The outer side 69 of the ring 60 is positioned proximate to the lip 37 and covers the sidewall 32 of the inner side 34 of the tire 30. The outer side 69 of the ring 60 may contact the lip 37 without compressing the lip 37. A portion of the outer circumference 82 of the band 80 is proximate to or may contact a portion of the tire 30.

The band 70 is positioned past the outer circumference 31 of the tire 30. The band 70 encircles the tire 30. The inner circumference 72 of the band 70 may be positioned proximate to the outer circumference 31 of the tire 30. The band 70 covers a portion of a width 36 of the tire 30. In an example embodiment, the ring 60, the band 80 and the band 70 cover (e.g., enclosed) the sidewall 32 on the inner side 34 of the tire 30 completely. Further, the band 70 covers a portion of the width 36 of the tire 30 closest to the inner side 34 of the tire 30. As a result, the sidewall 32 on the inner side 34 of the tire 30 does not come into contact with the disk blade 17, so wear of the tire 30 is significantly reduced if not completely eliminated.

The tire 30, and the outer circumference 76 of the band 70 at least in part, set the cutting depth of the disk blade 17, and thus the disk opener 16, into the ground 14 to open a furrow to plant the seed. The outer side 69 of the ring 60, the inner edge 84 of the band 80, and the inner circumference 88 of the band 80 are positioned proximate to the side of the disk blade 17 of the disk opener 16 of the planter 12. The proximate position of the inner side 68, the inner edge 84 and the inner circumference 88 to the disk blade 17 position the ring 60, the band 70 and the band 80 to scrape mud from the disk blade 17. The inner side 68 of the ring 60, the inner edge 84 of the band 80 and the inner circumference of the band 80 push against the mud to knock it away from the tire 30. The outer circumference 76 of the band 70 also aids in pushing mud off of and away from the disk blade 17. The band 70 also blocks mud from being pushed between the ring 60 and the inner side 34 of the tire 30.

As with other embodiments, the band 70, the ring 60 and the band 80 may be formed of a metal. In such an example embodiment, the band 70 is welded to the outer side 69 of the ring 60. The band 70 is positioned away from and encircles the inner circumference 64 of the ring 60. The outer circumference 76 of the band 70 may be flush with the outer circumference 62 of the ring 60. The inner circumference 64 of the ring is positioned against the outer circumference 82 of the band 80 and the ring 60 is welded to the band 80. The inner edge 84 of the band 80 may be flush with the inner side 68 of the ring 60. The outer edge 86 of the band 80 may be welded to the inner side 44 of the rim 40 to attached the ring 60, the band 70 and the band 80 to the depth gauge wheel 28.

I. Operation of First Embodiment

In use, the inner side 24 of the depth gauge wheel 20 or 26 is positioned proximate to the disk blade 17 of the disk opener 16 of the planter 12 (e.g., role planter). The ring 50 or the ring 60 and the band 70 come into contact with the disk blade 17, rather than the inner side 34 of the tire 30, to reduce wear on the tire 30. The ring 50 or the ring 60 and the band 70 are proximate to or come into contact with the disk blade 17 to scrape mud from the disk blade 17. The tire 30 contacts the surface of the ground 14 to set the cutting depth of the disk opener 16. The cutting depth determines the depth at which the seeds are planted.

Unless otherwise defined, all technical and scientific terms used herein have the same meaning as commonly understood by one of ordinary skill in the art to which this invention belongs. Although methods and materials similar to or equivalent to those described herein can be used in the practice or testing of the various embodiments of the present disclosure, suitable methods and materials are described above. All patent applications, patents, and printed publications cited herein are incorporated herein by reference in their entireties, except for any definitions, subject matter disclaimers or disavowals, and except to the extent that the incorporated material is inconsistent with the express disclosure herein, in which case the language in this disclosure controls. The various embodiments of the present disclosure may be embodied in other specific forms without departing from the spirit or essential attributes thereof, and it is therefore desired that the various embodiments in the present disclosure be considered in all respects as illustrative and not restrictive. Any headings utilized within the description are for convenience only and have no legal or limiting effect.

What is claimed is:

1. A wear ring for a depth gauge wheel for a planter, comprising:
    a ring having an outer circumference, wherein an outer side of the ring is planar, wherein the ring is adapted to be attached to an inner side of a rim of the depth gauge wheel, wherein at least a portion of the outer circumference of the ring is adapted to be positioned inside an inner circumference of a lip of a tire attached to the rim with the lip positioned near the inner side of the rim, and wherein the depth gauge wheel is adapted to be mounted on the planter proximate a disk blade of the planter with the ring facing the disk blade; and
    wherein the ring is adapted to protect the inner side of the tire from wear through contact with the disk blade during operation of the planter.

2. The wear ring of claim 1, wherein the ring is adapted to scrape mud from the disk blade during operation of the planter.

3. The wear ring of claim 1, wherein the ring is welded to the inner side of the rim to attach the ring to the rim.

4. The wear ring of claim 1, wherein an outer side of the lip is a first distance away from the inner side of the tire, wherein the outer side of the ring extends a second distance away from the inner side of the tire, wherein the second distance is greater than the first distance.

5. The wear ring of claim 1, wherein the inner side of the rim, the inner side of the tire and the ring are positioned parallel to a surface of the disk blade.

6. A wear ring for a depth gauge wheel for a planter, comprising:
    a ring having an inner circumference and an outer circumference, wherein the ring defines an outer planar surface extending between the outer circumference to the inner circumference, wherein the ring is adapted to be attached to an inner side of a rim of the depth gauge wheel;
    wherein the depth gauge wheel is adapted to be mounted on the planter proximate a disk blade of the planter with the ring facing the disk blade.

7. The wear ring of claim 6, wherein the ring is adapted to scrape mud from the disk blade during operation of the planter.

8. The wear ring of claim 6, wherein the ring is adapted to protect an inner side of a tire attached to the rim from wear through contact with the disk blade during operation of the planter.

9. The wear ring of claim 6, wherein the outer circumference of the ring is adapted to be positioned inside the inner circumference of a lip of a tire attached to the rim.

10. The wear ring of claim 9, wherein the lip has a height, wherein the ring has a thickness, wherein the thickness of the ring is greater than the height of the lip whereby the ring extends past the lip thereby protecting the lip from wear.

11. The wear ring of claim 9, wherein an outer side of the lip is a first distance away from an inner side of the tire, wherein the outer planar surface of the ring extends a second distance away from the inner side of the tire, wherein the second distance is greater than the first distance.

12. The wear ring of claim 6, wherein the rim and the ring are formed of a metal, wherein the ring is welded to the inner side of the rim to attach the ring to the rim.

13. A mud scraping system for a depth gauge wheel for a planter, comprising:
- a rim having an inner side;
- a tire having a lip around an inner side thereof, wherein the lip has an inner circumference, wherein the tire is attached to the rim with the lip positioned near the inner side of the rim; and
- a ring having an outer circumference, wherein an outer side of the ring is planar, wherein the ring is adapted to be attached to the inner side of the rim of the depth gauge wheel, wherein at least a portion of the outer circumference of the ring is positioned inside the inner circumference of the lip of the tire attached to the rim with the lip positioned near the inner side of the rim, and wherein the depth gauge wheel is adapted to be mounted on the planter proximate a disk blade of the planter with the ring facing the disk blade;

wherein the ring is adapted to scrape mud from the disk blade during operation of the planter.

14. The mud scraping system of claim 13, wherein the ring is welded to the inner side of the rim to attach the ring to the rim.

15. The mud scraping system of claim 13, wherein an outer side of the lip is a first distance away from the inner side of the tire, wherein the outer side of the ring extends a second distance away from the inner side of the tire, wherein the second distance is greater than the first distance.

16. The mud scraping system of claim 13, wherein the inner side of the rim, the inner side of the tire and the ring are positioned parallel to a surface of the disk blade.

* * * * *